United States Patent [19]

Suzuki et al.

[11] Patent Number: 5,113,719

[45] Date of Patent: May 19, 1992

[54] ENGINE LOAD RESPONSIVE LINE PRESSURE CONTROL ARRANGEMENT FOR AUTOMATIC AUTOMOTIVE TRANSMISSION

[75] Inventors: Yutaka Suzuki, Hadano; Masayuki Kobayashi, Isehara; Tatsuo Wakahara, Kawasaki, all of Japan

[73] Assignee: Nissan Motor Co., Ltd., Japan

[21] Appl. No.: 363,261

[22] Filed: Jun. 8, 1989

[30] Foreign Application Priority Data

Jun. 8, 1988 [JP] Japan .................. 63-139232

[51] Int. Cl.⁵ .............................. B60K 41/06
[52] U.S. Cl. ........................ 74/866; 74/867
[58] Field of Search ............ 74/862, 866, 867, 868, 74/869; 364/424.1; 192/0.055, 0.075, 0.076

[56] References Cited

U.S. PATENT DOCUMENTS

| | | | |
|---|---|---|---|
| 4,296,652 | 10/1981 | Oberpichler et al. | 74/867 X |
| 4,324,156 | 4/1982 | Iwanaga et al. | 74/869 |
| 4,331,045 | 5/1982 | Piech et al. | 74/867 |
| 4,347,764 | 9/1982 | Lauven | 74/867 |
| 4,350,234 | 9/1982 | Suga et al. | 74/866 X |
| 4,354,236 | 10/1982 | Miki et al. | 364/424.1 |
| 4,394,827 | 7/1983 | Kubo et al. | 74/868 |
| 4,428,258 | 1/1984 | Kubo et al. | 74/867 |
| 4,563,918 | 1/1986 | Sagano | 74/869 |
| 4,724,724 | 2/1988 | Tezuka | 192/0.075 X |

FOREIGN PATENT DOCUMENTS

0047517 3/1982 European Pat. Off. .
0234685 9/1987 European Pat. Off. .

Primary Examiner—Dwight G. Diehl

[57] ABSTRACT

When the load on the engine of an engine/transmission system reduces suddenly, the sudden reduction is used as a trigger to delay the reduction of the line pressure which is supplied to the friction elements of the transmission in a predetermined manner which allows for engine speed/torque output to actually drop to the same level as the load.

11 Claims, 9 Drawing Sheets

FIG.12 ived from said third table on the basis of the instant values of TVO and NE.

ENGINE LOAD RESPONSIVE LINE PRESSURE CONTROL ARRANGEMENT FOR AUTOMATIC AUTOMOTIVE TRANSMISSION

BACKGROUND OF THE INVENTION

1. Field of the Invention

The present invention relates generally to an automatic transmission for use in automotive vehicles and more specifically to a line pressure control arrangement for such a transmission which maintains an adequate amount of friction element engagement during modes of operation when a sudden reduction in engine load occurs.

2. Description of the Prior Art

An automatic transmission Service Manual (publication A261C07) issued in March 1987 by the Nissan Motor Company relating to the so called RE4R01A type transmission, describes an arrangement which utilizes tabled data for controlling the line pressure in response to engine load during shifting and non-shifting modes of transmission operation.

In this arrangement in order to control the level of line pressure to one suited for the instant mode of operation and therefore obviate shift shock which tends to be induced by excessively high line pressures, the engine throttle valve opening degree is used to determine the duty cycle of a signal which is used to control a line pressure control solenoid valve.

However, with this arrangement, as the line pressure is controlled in direct response to the throttle valve position, a problem is encountered in that when a depressed accelerator pedal is suddenly released, the line pressure drops suddenly along with the amount of amount of torque which is transmitted through the transmission, to a level lower than actually desirable.

There are several notable examples wherein such a phenomenon induces undesirable transmission operational characteristics.

The first is such that under stall conditions, when the accelerator pedal is released, the intertia torque is larger than the torque actually being produced by the engine. Nevertheless, the level of line pressure is controlled in response to the throttle opening degree and is according suddenly reduced with the rapid closure of the throttle valve. The amount of engagement of the friction elements becomes lower than suited for handling the reverse flowing inertia torque and the jitter occurs.

Figure 6:
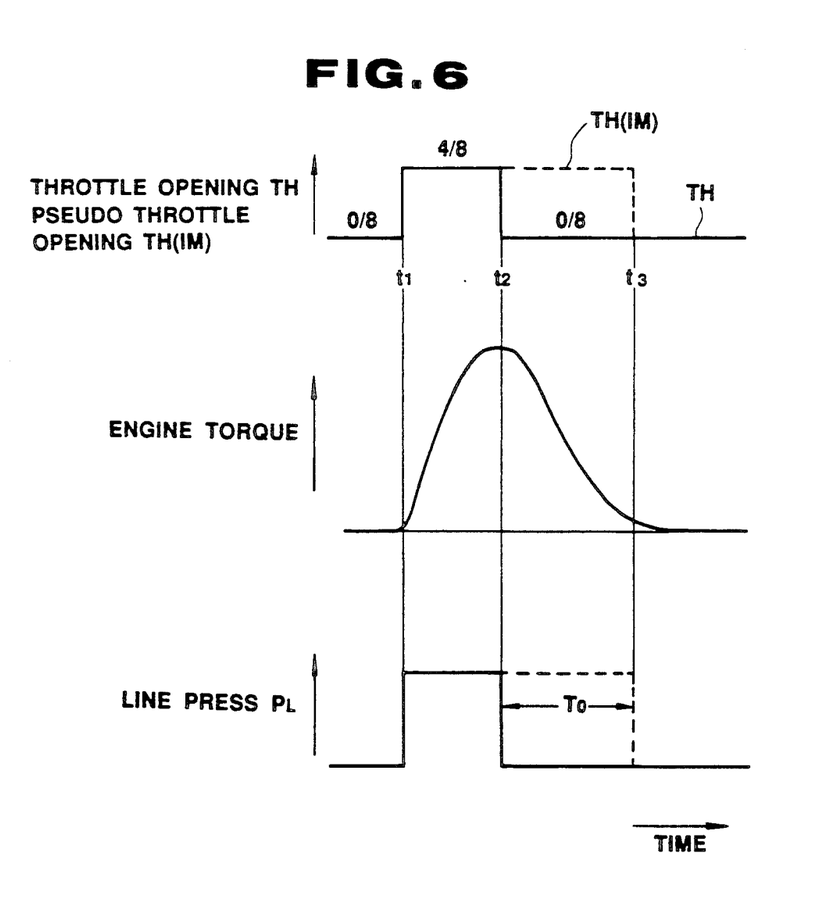
FIG. 6 is a timing chart which shows the control characteristics achieved with the second embodiment of the present invention.

The second is such that when, as shown in FIG. 6A, the throttle valve opening is moved from TH=0/8 such as indicated at time t1, to an opening of TH=4/8, and then subsequently closed again to TH=0/8, the engine torque rises and falls as indicated in FIG. 6B. However, the line pressure tends to closely parallel the throttle opening as indicated in the solid line trace in FIG. 6C. As a result, during the period To which is defined between t2 and t3, the torque smoothly decreases from a peak value while the line pressure drops to a level which is inadequate to handle the amount of torque being outpulled by the engine and as a result jitter is again encountered.

Figure 9:
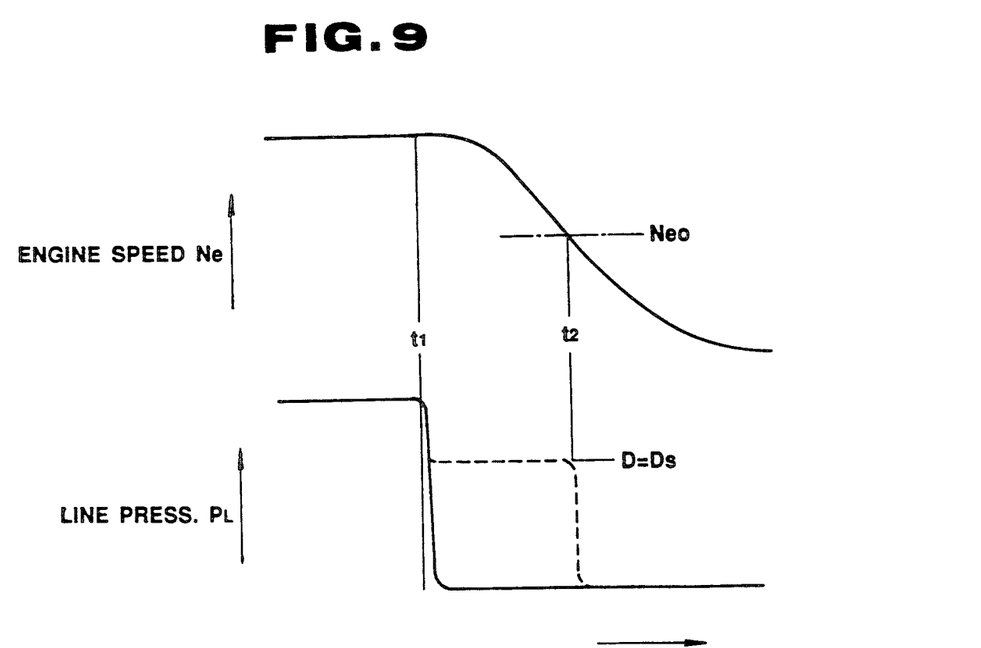
FIG. 9 is a timing chart showing the control characteristics produced by the third embodiment.
Figure 11:
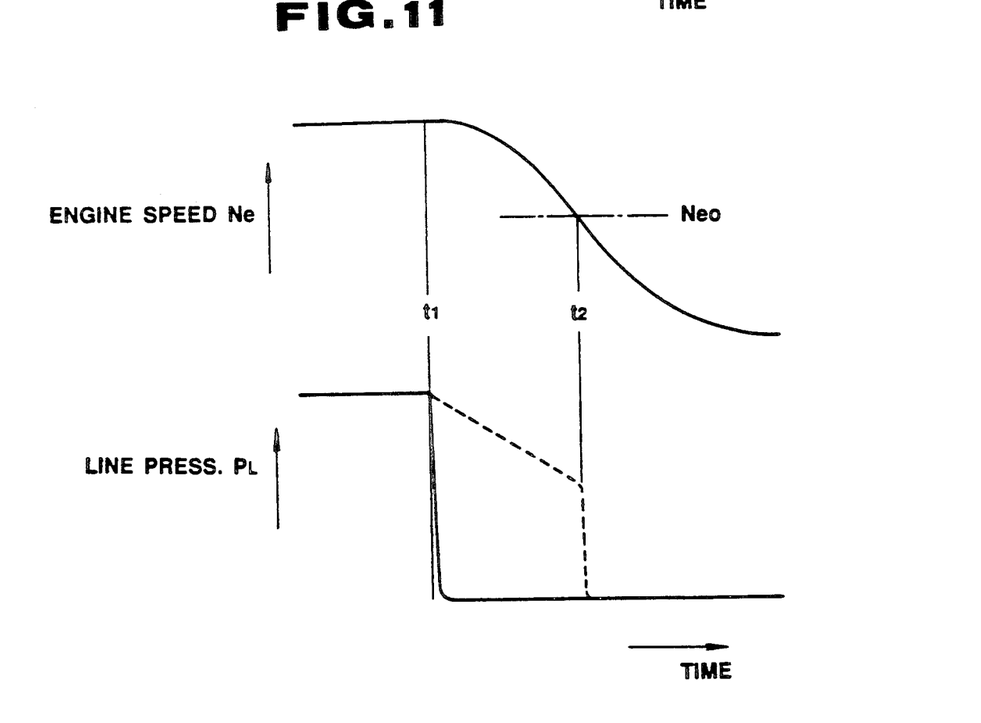
FIG. 11 is a timing chart which shows the control characteristics produced by the fourth embodiment.

In a third instance (see FIGS. 9 and 11) when during stall conditions the accelerator pedal is released, the engine speed reduces as indicated in FIG. 9A, while the line pressure drops suddenly as indicated by the solid line trace in FIG. 9B. Accordingly, during the period the engine speed reduces relatively slowly, a relatively large amount of torque continues to be supplied from the torque converter to the transmission. Again under these conditions the amount of force with which the friction elements of the transmission are engage is reduced to a level which is inadequate for the instant set of operating conditions and jitter is produced.

SUMMARY OF THE INVENTION

It is an object of the present invention to provide a line pressure control of the nature which enables the line pressure to be decreased in response to sudden decreases in engine load, in a manner which maintains and adequate level of friction element engagement and obviates the above discussed problems.

In brief, the above object is achieved by an arrangement wherein, when the load on the engine of an engine/transmission system reduces suddenly, this sudden reduction is used as a trigger to delay the reduction of the line pressure which is supplied to the friction elements of the transmission in a predetermined manner which allows for engine speed/torque output to actually drop to the same level as the load.

More specifically, a first aspect of the present invention is deemed to comprise a line pressure control system for an automatic automotive transmission which features: means for selectively controlling the level of line pressure in response to changes in the load applied to the engine of an engine operatively connected with the transmission; means for detecting the rate at which the load on the engine is changing; and means for delaying the reduction in line pressure in response to rapid reductions in the engine load.

A second aspect of the present invention is deemed to comprise a line pressure control system for an automatic automotive transmission which features: means for selectively controlling the level of line pressure in response to changes in the load applied to an engine which is operatively connected with the transmission; means for sensing the rotational speed of the engine; means for sensing the rotation speed of the output shaft of the transmission; means for detecting the rate at which the load applied to the engine is changing; and means for delaying the reduction in line pressure in response to rapid reductions in the load applied to the engine and in accordance with the sensed rotational engine speed.

A third aspect of the invention is deemed to comprise a vehicle which features: an internal combustion engine; a transmission, the transmission being operatively operated with the internal combustion engine; a load sensor, the load sensor being arranged to sense the load on the engine and produce a signal indicative of the same; a source of line pressure which supplies hydraulic fluid under pressure to a plurality of friction elements, the friction elements being selectively engageable to produce a plurality of gears; a line pressure control solenoid, the line pressure solenoid being arranged to be operated by a control signal the duty cycle of which is selectively variable; a memory in which a line pressure control schedule is stored, the line pressure control schedule being recorded in terms of duty cycle and throttle position; a control circuit, the control circuit being responsive to the load sensor, operatively connected with the memory and arranged to produce the control signal, the control circuit including: first means responsive to the signal indicative of load for determining the rate at which the load on the engine is changing; and second means for modifying the control signal in the event that the first means indicates that the the load on the engine is reducing at a rate which is greater than a predetermined value.

A fourth aspect of the invention is deemed to comprise a vehicle which features: an engine, the engine having a throttle valve; a transmission, the transmission being operatively operated with the internal combustion engine, the transmission having an input shaft and an output shaft; a load sensor, the load sensor being arranged to sense the position of the throttle valve; a plurality of friction elements, the friction elements being selectively engageable to produce a plurality of gears; a source of line pressure which supplies hydraulic fluid under pressure; a line pressure control solenoid, the line pressure solenoid being arranged to be operated by a control signal the duty cycle of which is selectively variable; a memory in which line pressure control data is stored, the line pressure control data comprising: a line pressure control schedule, the line pressure control schedule being recorded in terms of duty cycle and throttle position; a control circuit, the control circuit being responsive to the load sensor, the control circuit being operatively connected with the memory, the control circuit being arranged to produce the control signal, the control circuit including: first means for determining the rate at which the load on the engine is changing; and second means for modifying the control signal in the event that the first means indicates that the the load on the engine is reducing at a rate which is greater than a predetermined value.

A fifth aspect of the present invention is deemed to comprise a method of controlling the level of line pressure in an automatic transmission which features the steps of: determining the load on engine operatively connected with the the transmission; controlling the level of line pressure in accordance with the load on the engine; detecting the rate at which the load on the engine is reducing being above a predetermined level; and delaying the reduction in the line pressure in the event that the load on the engine reduces at a rate above the predetermined one.

DETAILED DESCRIPTION OF THE PREFERRED EMBODIMENTS

Figure 1:
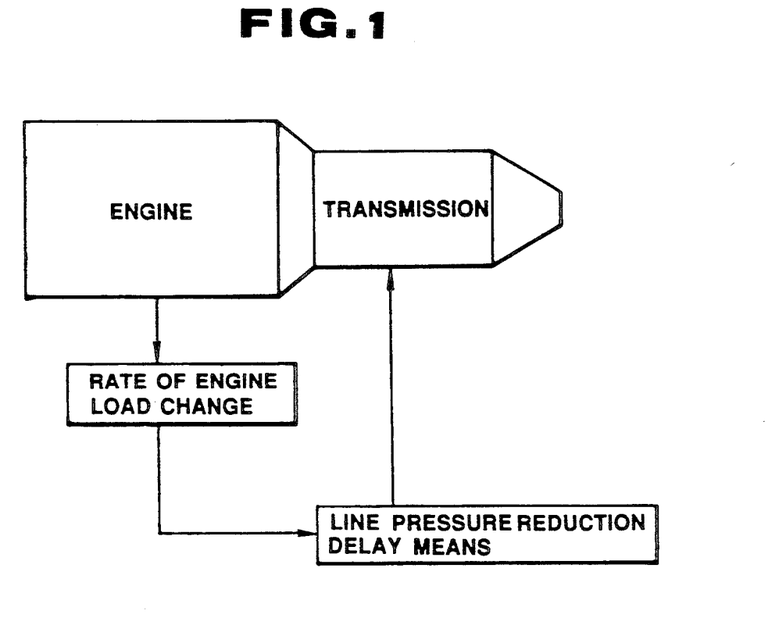
FIG. 1 is a diagram showing the concept of the line pressure control according to the present invention.
Figure 2:
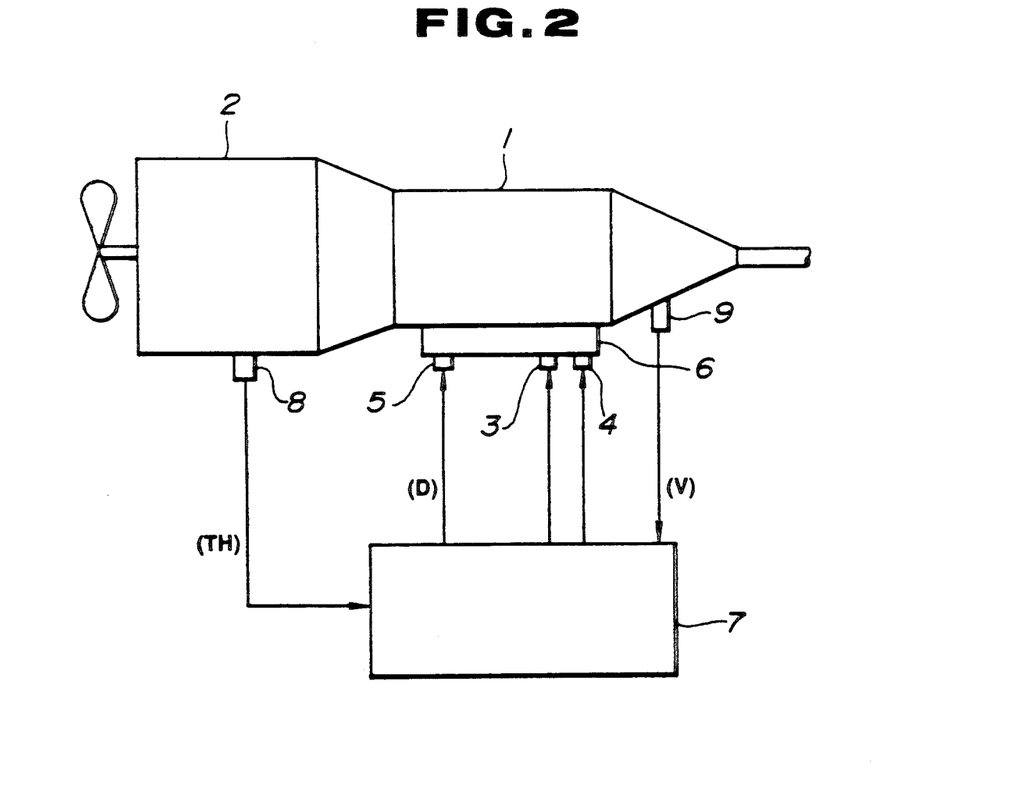
FIG. 2 is a diagram showing the system which embodies a first embodiment of the present invention.

FIG. 2 shows a system which embodies a first embodiment of the present invention. In this arrangement an automatic transmission 1 of the so called RE4R01A type described in Service Manual (publication A261C07) issued in March 1987 by the Nissan Motor Company, is operatively connected with an internal combustion engine 2 by way of a torque converter (no numeral). First and second shift solenoids 3 and 4 and a line pressure control solenoid 5 are operatively connected with a valve body 6. In accordance with the selective energization of the shift solenoids 3 and 4 (shown in the table below), line pressure is supplied to the friction elements of the transmission in a manner to selectively produce first to fourth forward speeds.

TABLE

| | GEAR: | | | |
| --- | --- | --- | --- | --- |
| | FIRST | SECOND | THIRD | FOURTH |
| SOL. 3: | ON | OFF | OFF | ON |
| SOL. 4: | ON | ON | OFF | OFF |

Figure 12:
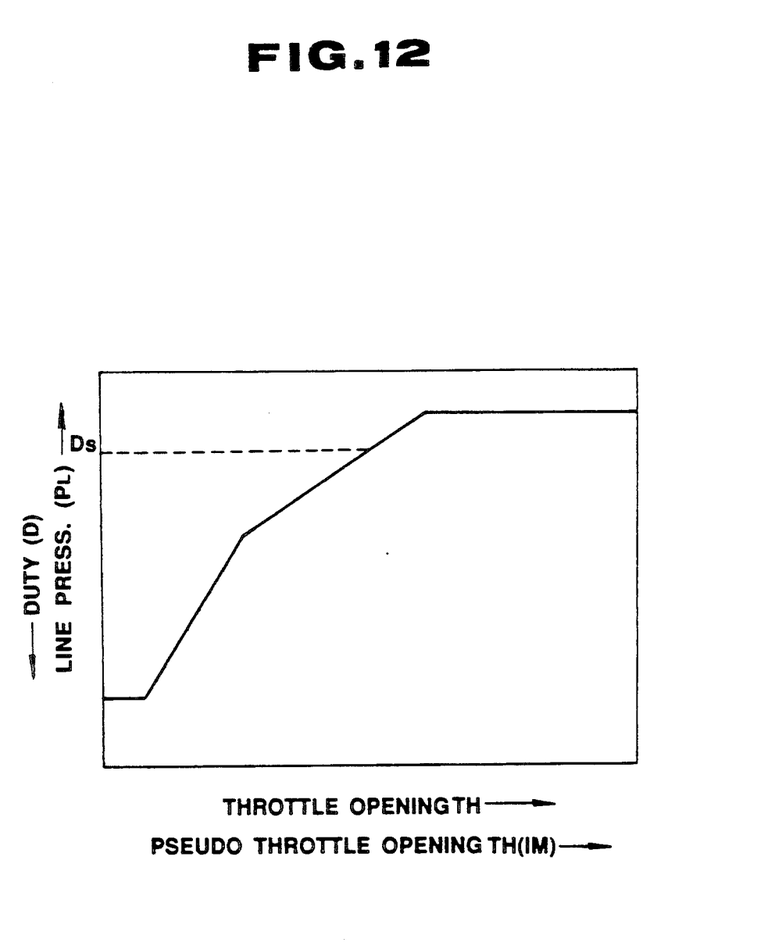
FIG. 12 is a chart which compares, in terms of throttle (and pseudo throttle opening) and duty cycle (and line pressure) the normal line pressure variation characteristics, with those produced by the present invention.

The level of the line pressure which is supplied to the friction elements is controlled by the duty cycle of the signal which is applied to the line pressure control solenoid 5. In this instance, as shown in FIG. 12 the level of line pressure is arranged to decrease with the increase in duty cycle and vice versa.

A control unit 7 which includes a microprocessor is arranged to receive data input from a engine throttle position sensor 8 and a vehicle speed sensor 9. Using this data the control unit determines which gear the transmission should be conditioned to produce and determines the appropriate energization pattern for the shift solenoids. The appropriate level of line pressure is also determined in accordance with the data inputted from the throttle valve position sensor 8.

Figure 3:
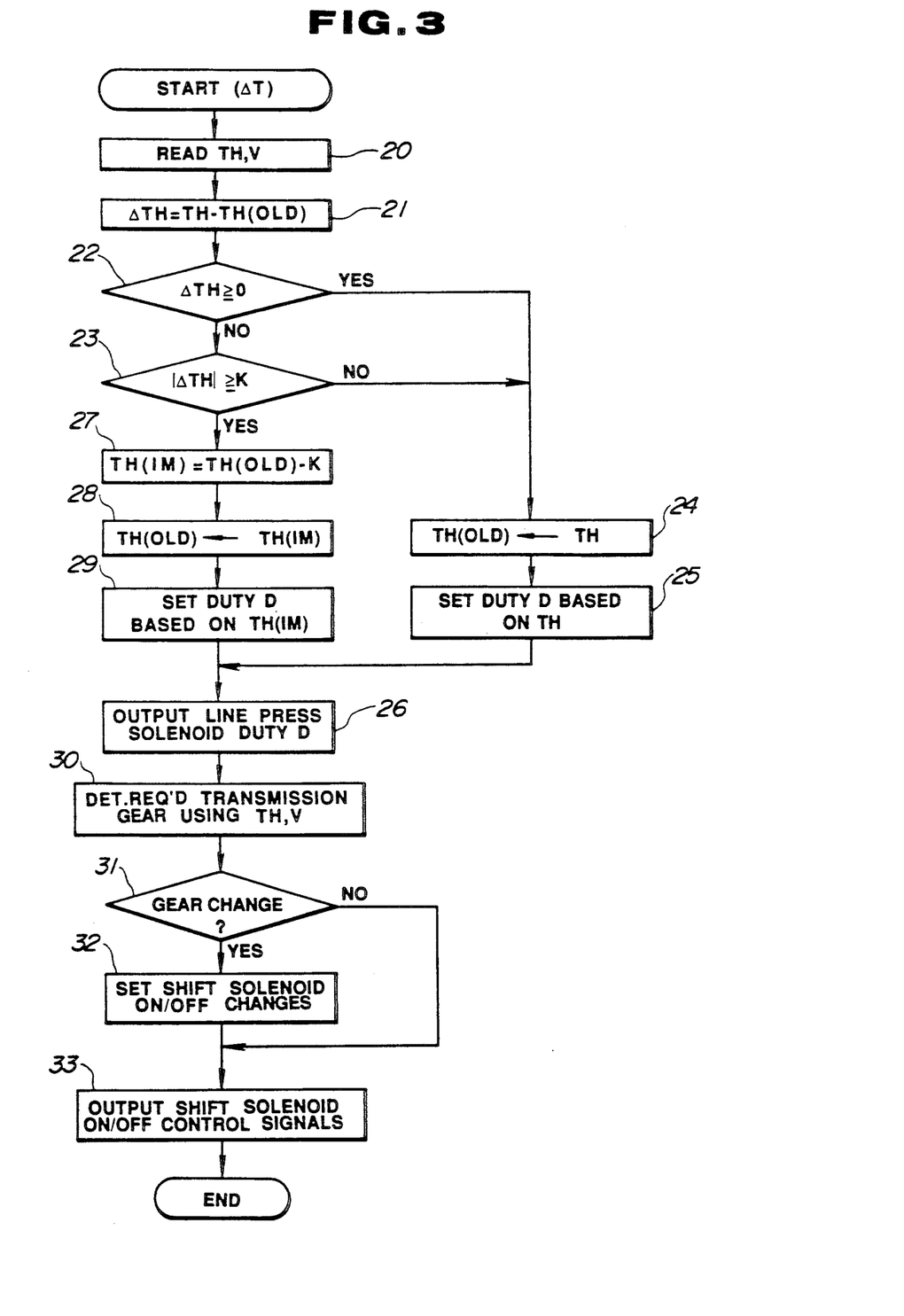
FIG. 3 is a flow chart showing the characterizing operations which are performed by a control routine according to the first embodiment of the present invention.
Figure 4:
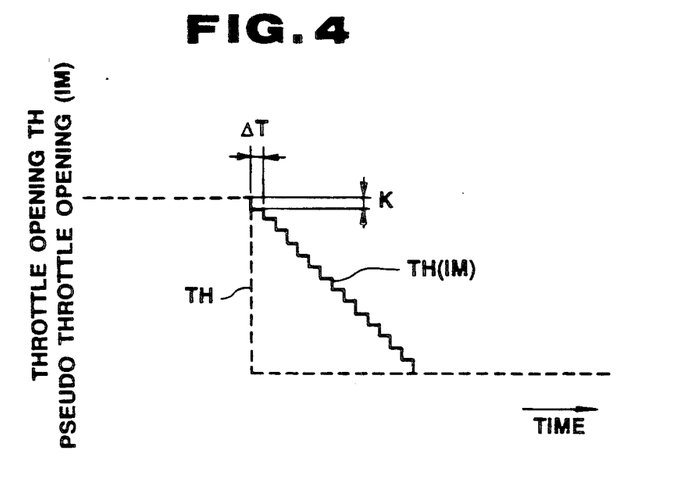
FIG. 4 is a chart showing in terms of time and throttle valve opening the line pressure control characteristics which are provided by the first embodiment of the present invention.

FIG. 3 depicts in flow chart form the steps which are executed by a control routine. In this instance the control routine is arranged to be run at predetermined time intervals $\Delta T$. By way of example, $\Delta T$ can be set at 10 msec.

The first step 20 of this routine is such as to read the instant values of throttle position TH and vehicle speed V and set these in memory for further processing. At step 21 the change $\Delta TH$ is determined by subtracting the instant TH value with that TH(OLD) which was recorded on the previous run of the routine.

At step 22 it is determined if the value of TH has decreased. In the event that $\Delta TH \geq 0$ then the routine flows across to step 24 wherein the TH(OLD) value is updated via recording of the instant TH value at its memory address.

However, in the event that $\Delta TH$ is less than 0, then the routine goes to step 23 wherein the absolute change $|\Delta TH|$ is compared with a value K. In the event that

|ΔTH| is less than K the routine flows to step 24 while in the event that it is greater or equal to K the routine goes to step 27 wherein a pseudo throttle value TH(IM) is determined by subtracting the value of K from the instant TH(OLD).

Steps 24 and 25 are such as to update the value of TH(OLD) and to determined the line pressure duty cycle valve D in accordance with the instant value of TH.

At step 28 the valve of TH(OLD) is updated via the recording of the TH(IM) value at its memory address and at step the value of TH(IM) is used to determine the duty cycle of the signal which is applied to the line pressure control throttle valve 5.

As will be appreciated, steps 27 and 28 are such as to decrement the throttle value TH(IM) by an increment K per run of the control routine while the actual amount of closure per run is greater than K. Accordingly, the rate at which the line pressure is decreased is controlled to a predetermined rate and not in accordance with the rate at which the actual throttle valve position is closing.

Accordingly, the line pressure is gradually reduced under the control of the pseudo throttle opening value TH(IM) and not permitted to drop so rapidly as to bring about the situation wherein the level of line pressure is insufficient for the instant torque transmission conditions.

At step 26 a signal having the duty cycle determined in step 29 is issued to solenoid 5.

Steps 26 to 33 relate to the setting of the shift solenoids 3 and 4 in accordance with the instant set of engine load and vehicle speed conditions.

In step 30 the gear in which the transmission should be set for the instant set of V and TH values is determined. Following this at step 31 the instant gear the transmission is conditioned to produce is compared with the one determined in step 30. In the event that the two gears are the same the routine by-passes step 32 and goes directly step 33 wherein commands which maintain the instant set of solenoid energizations are issued.

On the other hand, if the two gears are not the same then at step 32 the change which is required and the manner in which the change should be implemented is determined. This determination of course involves the determination of solenoid energization pattern or patters which should be effected to being about the required transmission shift.

SECOND EMBODIMENT

Figure 5:
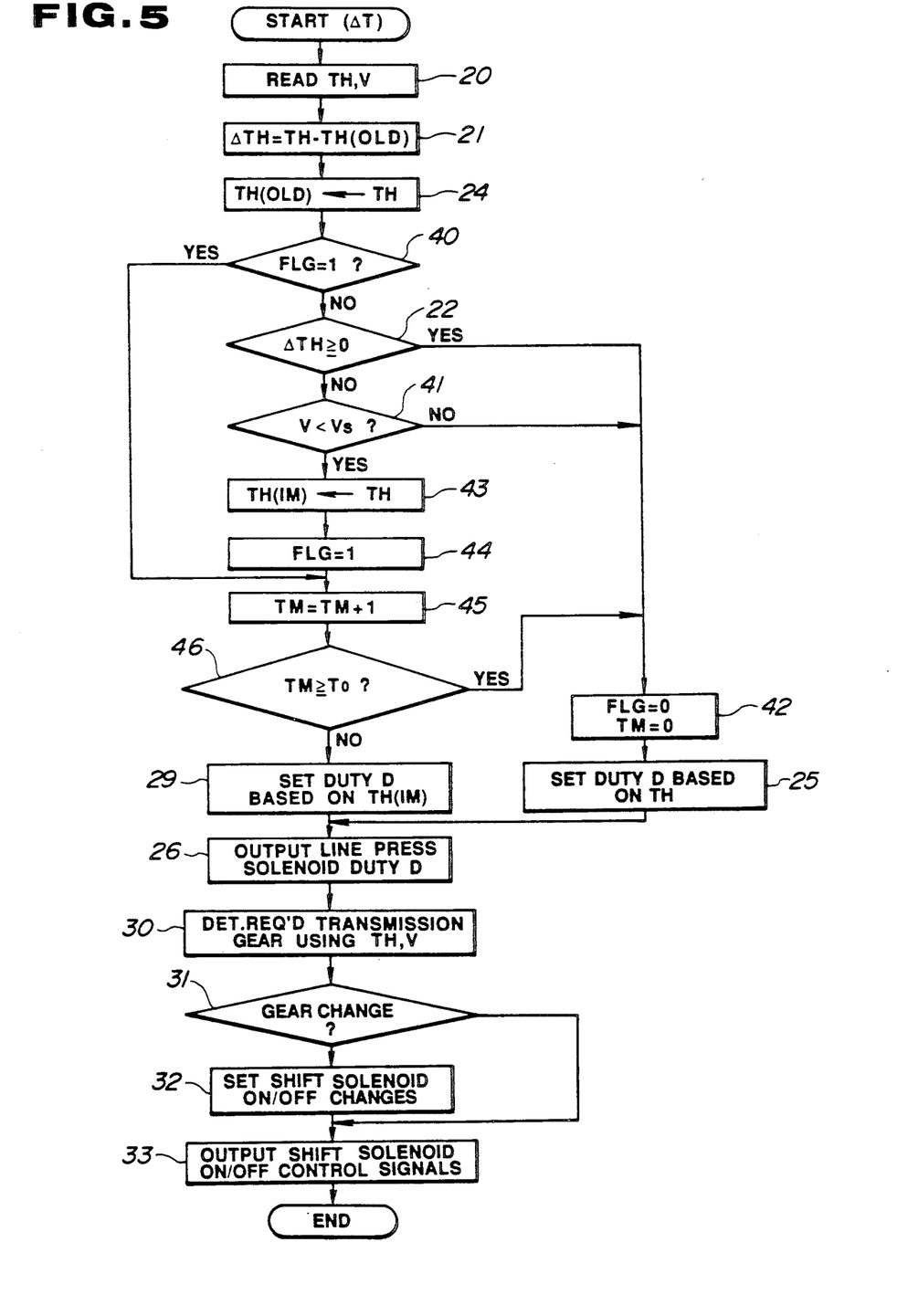
FIG. 5 is a flow chart depicting the operations which are performed in accordance with a second embodiment of the present invention.

FIG. 5 shows the control routine which is implemented in accordance with a second embodiment of the present invention. The routine which characterizes this embodiment is basically similar to the one shown in FIG. 3 and differs in that following an update of the TH(OLD) value in step 24, the status of a flag FLG is checked (step 40) to determine if it has been set=1 or not. In the event that the flag has not been set then at steps 22 and 41 the magnitude of ΔTH and the vehicle speed are sequentially checked. That is to say, in the event that ΔTH is found to be less than 0 (indicative of the throttle valve closing) the instant speed is checked to determine if it is below a predetermined value Vs (where Vs is a relative small value) or not.

If the vehicle speed is below the above mentioned limit, then at step 44 the flag FLG is set and at step 45 the count of a soft timer TM is incrementally increased.

While the count of the timer TM is less than a preset value of To the routine flows to step 29 wherein the instant value of TH(IM) is used to determine the duty cycle D to be applied to solenoid 5.

Steps 26, and 30-33 are the same as the corresponding steps described in connection with the flow chart shown in FIG. 3.

The routine is arranged to flow to steps 42 and 25 in the event that the throttle valve is found to be either stationary of opening (ΔTH is equal to or greater than 0), the vehicle speed is equal to or greater than Vs, or the count of timer TM has exceeded To.

At step 42 flag FLG and the soft clock timer TM are cleared and in step 25 the instant value of TH is used directly to control the line pressure.

With this embodiment once the throttle valve is detected and closing and flag FLG is set, the routine will not pass through steps 22, and 41 to 44 until such time as timer TM finishes its count to To.

Accordingly, the value of TH(IM) remains constant for time To and as shown by chain line in FIG. 6(A) the line pressure is accordingly maintained as shown in chain line in FIG. 6C.

THIRD EMBODIMENT

Figure 7:
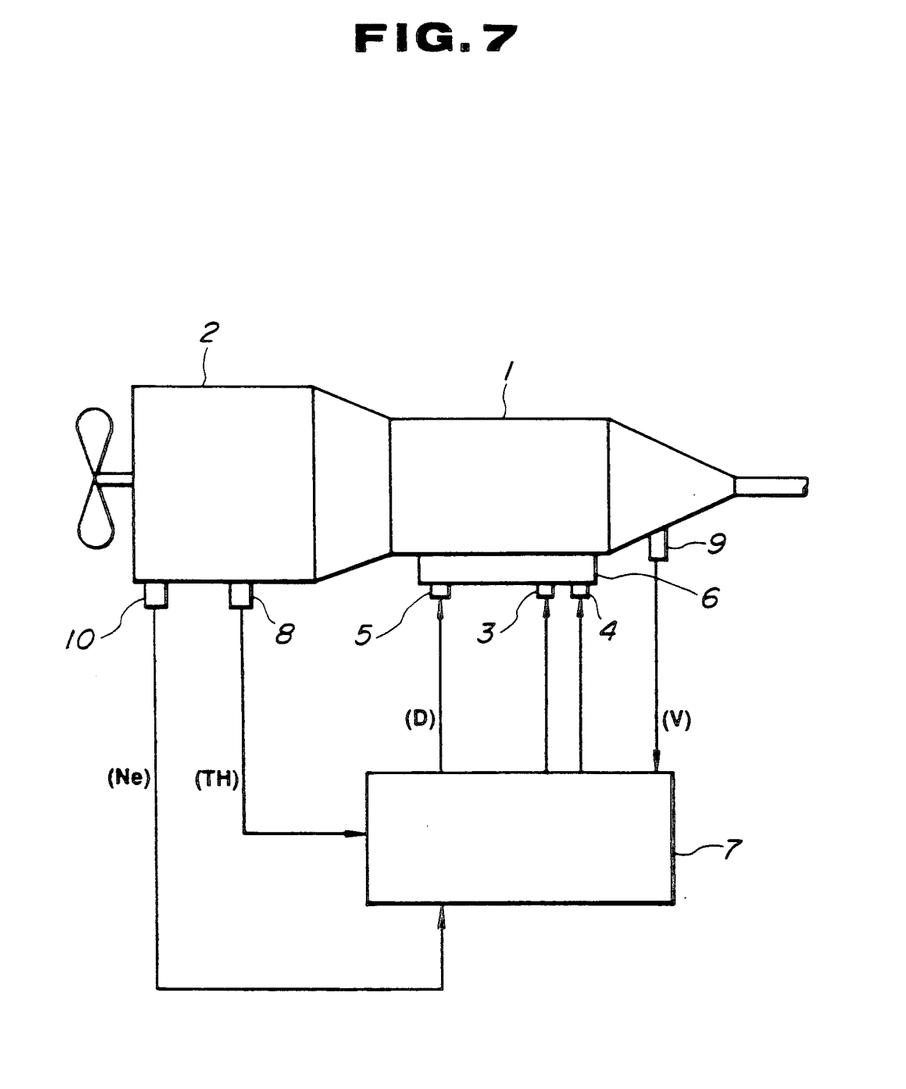
FIG. 7 is a diagram showing the system utilized in a third embodiment of the present invention.

FIG. 7 shows an engine/transmission system to which third and fourth embodiment of the invention is applied. As will be appreciated this system is essentially the same as the arrangement shown in FIG. 2 and further features the provision of an engine speed sensor 10.

Figure 8:
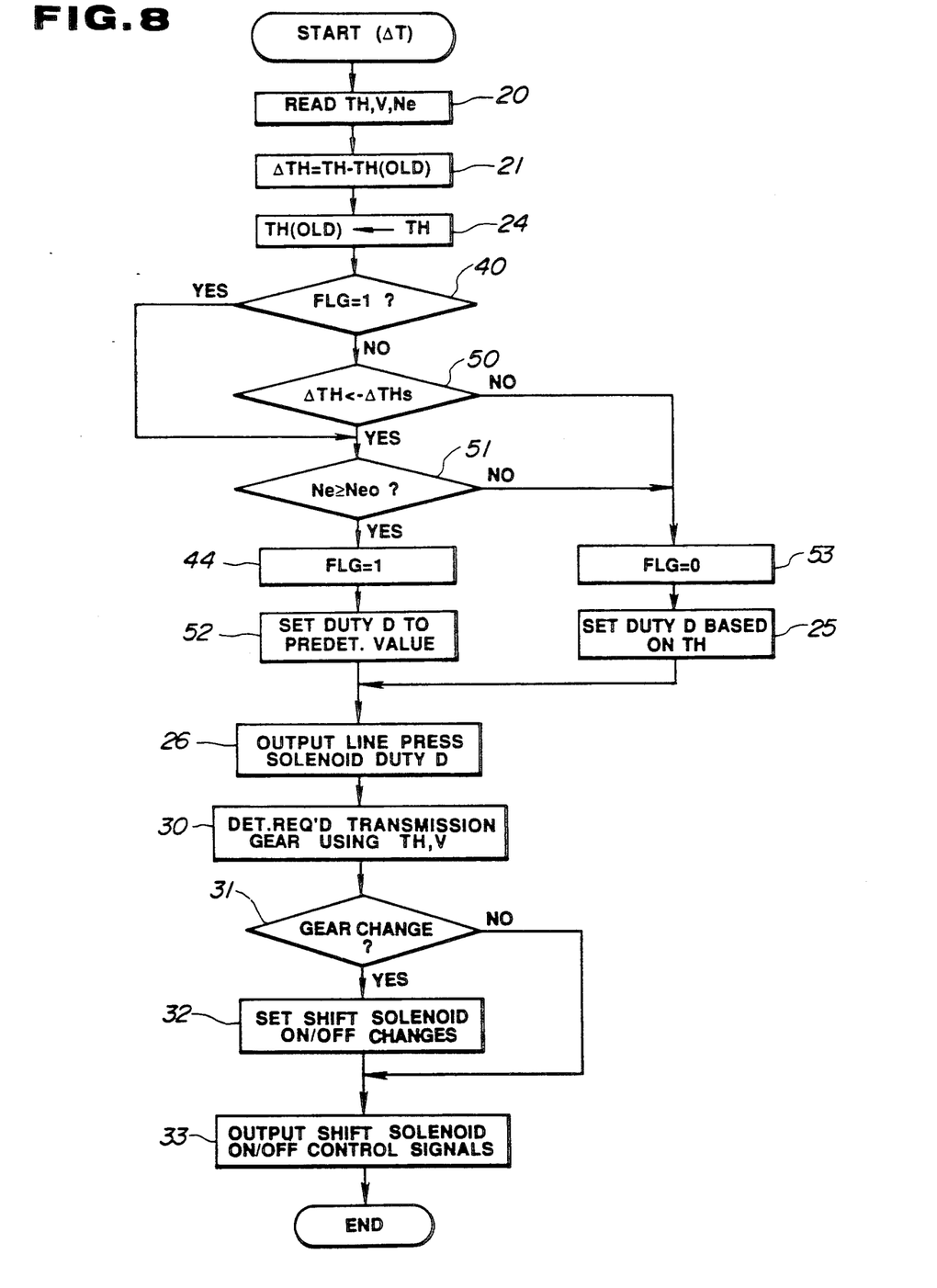
FIG. 8 is is a flow chart which depicts the characteristic operations produced by the third embodiment of the present invention.

FIG. 8 shows in flow chart form, the steps which characterize the control routine utilized in the third embodiment. In this routine the first four steps 20, 21, 24 and 40, of the routine are the same as those in the one shown in FIG. 5 with the exception that the engine speed Ne is read in step 20 in addition to the throttle position and vehicle speed data TH and V.

At step 50 and 51, the instant ΔTH is compared with a predetermined value −ΔTHs which is indicative of throttle closure which accompanies sudden deceleration and the instant engine speed Ne is compared with a given value Neo. In this case the value of Neo is a value which is set in accordance with the selected gear of the transmission.

In the event that ΔTH is less than −ΔTHs and the engine speed is equal to or greater than Neo then at step 44 flag FLG is set and at step 52 the value of the duty cycle D is set to a predetermined value Ds. In this embodiment, the values of Neo and Ds are set in the manner shown in FIGS. 9A and 9B. Accordingly, with the control provided by the above steps, the duty cycle is held at Ds until such time as the engine speed drops to Neo.

On the other hand, if the throttle opening is not closing at a rate which is equal to or greater than −ΔTHs or the engine speed is less than Neo then the routine flows to steps 53 and 25 wherein the flag FLG is cleared and the duty cycle determined in accordance with the instant throttle opening value TH.

Steps 26 and 30 to 33 are as described previously.

Thus, as will be appreciated, when the accelerator pedal is suddenly released, even through the actual throttle valve opening reduces very rapidly to a fully closed position (for example) the line pressure will be maintained at a level dictated by the selection of Ds and therefore maintain the friction elements adequately engaged until such time as the engine speed lowers to Neo and the amount of torque which is being transmitted to the transmission through the torque converter reduces to a minimal level.

FOURTH EMBODIMENT

Figure 10:
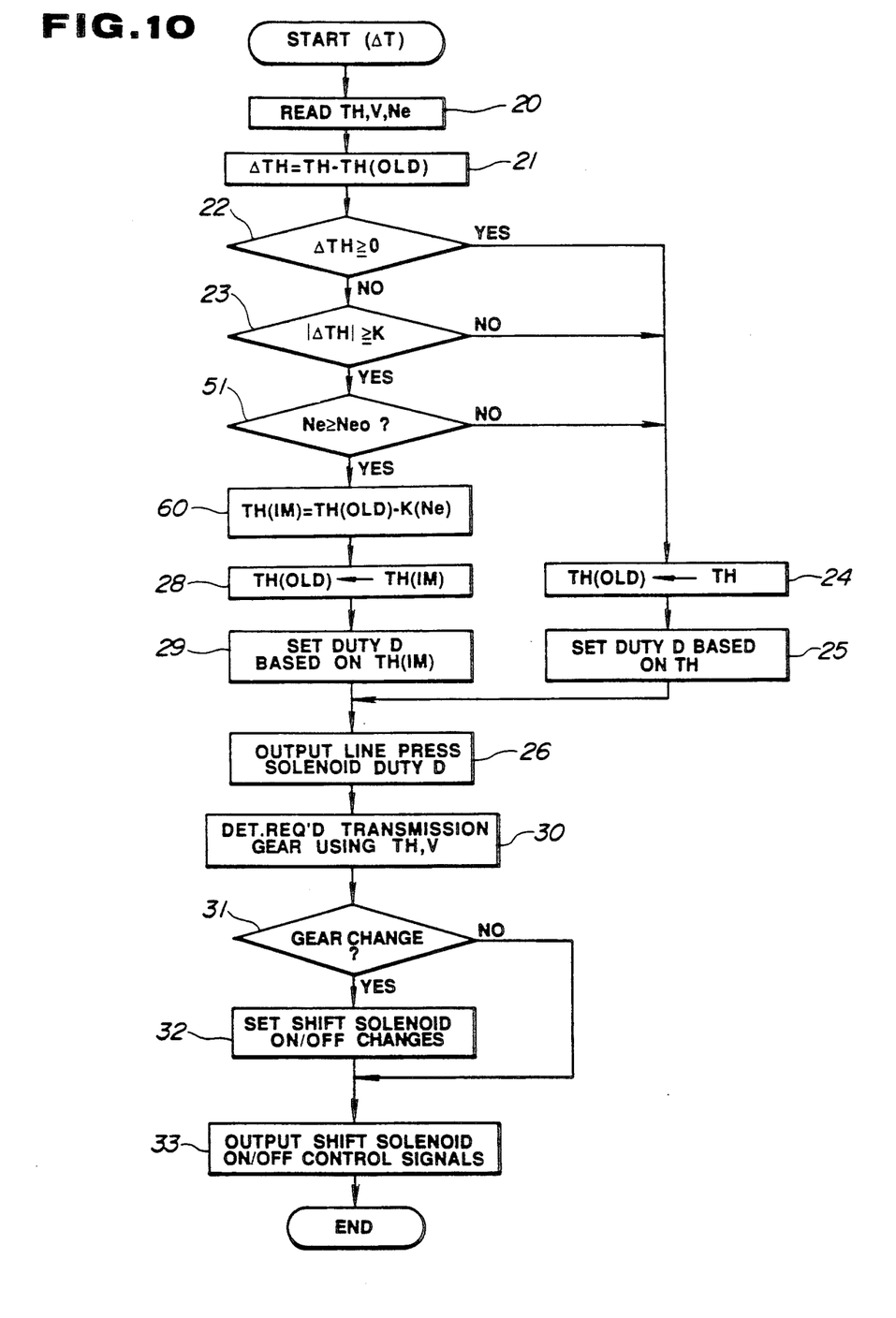
FIG. 10 is a flow chart which depicts the operations performed in accordance with a fourth embodiment of the present invention.

FIG. 10 shows the control routine which characterizes a fourth embodiment of the present invention. This embodiment produces the line pressure control indicated by the broken line in FIG. 11.

As will be noted, this program is essentially the same as that depicted in FIG. 3 and is arranged so that a new step 60 is introduced between steps 23 and 28 and arranged to follow step 51 wherein the engine speed is compared with the predetermined value Neo. In this new step TH(IM) is derived by reducing the value of TH(OLD) by an engine speed dependent increment K(Ne). TH(IM) is therefore incrementally decreased each run of the program until such time as the engine speed drops to Neo whereat the amount of torque which is delivered from the engine via the torque converter is sufficiently low that the level of the line pressure can be dropped to its minimum value without any slippage of the like occurring.

For further disclosure relating to shifting control performed in steps 30-33 and disclosure relating to the instant type of system to which the present invention is applied, reference may be had to:

1. U.S. Ser. No. 07/330,129 filed on Mar. 29, 1989 in the name of Narita;
2. U.S. Ser. No. (not yet available) filed on May 5 1989 in the name of Asono et al (claiming priority based on Japanese Patent Application No. P63-109101;
3. U.S. Ser. No. (not yet available) filed on Apr. 11, 1989 in the name of Narita (claiming priority based on Japanese Patent Application No. P63-87389); or
4. U.S. Ser. No. (not yet available) filed on Apr. 14, 1989 in the name of Narita (claiming priority based on Japanese Patent Application No. P63-91813).

It is noted that in the above mentioned arrangements the rotational speed of the transmission input shaft is also monitored and used in combination with the vehicle speed signal (taken in this embodiment from the rotational speed of the transmission output shaft) and used to develop a gear ratio which can be used to control the setting of the solenoid energizations.

Of course the present invention is not limited to the above type of transmissions wherein shifting is controlled in response to solenoid operation and can be applied to other types of transmission wherein shifting (merely by way of example) is controlled in response to throttle and governor pressures which are developed by mechanically operated valves.

What is claimed is:

1. In a line pressure control system for an automatic automotive transmission:
   means for selectively controlling the level of line pressure in response to changes in the load applied to the engine of an engine operatively connected with said transmission;
   means for detecting the rate at which the load on the engine is changing; and
   means for delaying the reduction in line pressure in response to rapid reductions in the engine load.

2. A line pressure control system as claimed in claim 1 wherein said line pressure reduction delaying means produces a pseudo engine load indicative signal and uses this pseudo engine load signal until the occurrence of a predetermined phenomenon.

3. A line pressure control system as claimed in claim 2 wherein said predetermined phenomenon comprises the engine speed of the engine which is operatively connected said transmission, falling below a predetermined level.

4. In a line pressure control system for an automatic automotive transmission:
   means for selectively controlling the level of line pressure in response to changes in the load applied to an engine which is operatively connected with said transmission;
   means for sensing the rotational speed of the engine;
   means for sensing the rotation speed of the output shaft of the transmission;
   means for detecting the rate at which the load applied to the engine is changing; and
   means for delaying the reduction in line pressure in response to rapid reductions in the load applied to the engine and in accordance with the sensed rotational engine speed.

5. In a vehicle
   an internal combustion engine;
   a transmission, said transmission being operatively operated with said internal combustion engine;
   a load sensor, said load sensor being arranged to sense the load on the engine and produce a signal indicative of the same;
   a source of line pressure which supplies hydraulic fluid under pressure to a plurality of friction elements, said friction elements being selectively engageable to produce a plurality of gears;
   a line pressure control solenoid, said line pressure solenoid being arranged to be operated by a control signal the duty cycle of which is selectively variable;
   a memory in which a line pressure control schedule is stored, said line pressure control schedule being recorded in terms of duty cycle and throttle position;
   a control circuit, said control circuit being responsive to said load sensor, operatively connected with said memory and arranged to produce said control signal, said control circuit including:
   first means responsive to said signal indicative of load for determining the rate at which the load on the engine is changing; and
   second means for modifying said control signal in the event that said first means indicates that the the load on the engine is reducing at a rate which is greater than a predetermined value.

6. In a vehicle
   an engine, said engine having a throttle valve;
   a transmission, said transmission being operatively operated with said internal combustion engine, said transmission having an input shaft and an output shaft;
   a load sensor, said load sensor being arranged to sense the position of said throttle valve;
   a plurality of friction elements, said friction elements being selectively engageable to produce a plurality of gears;
   a source of line pressure which supplies hydraulic fluid under pressure;
   a line pressure control solenoid, said line pressure solenoid being arranged to be operated by a control signal the duty cycle of which is selectively variable;

a memory in which line pressure control data is stored, said line pressure control data comprising:

a line pressure control schedule, said line pressure control schedule being recorded in terms of duty cycle and throttle position;

a control circuit, said control circuit being responsive to said load sensor, said control circuit being operatively connected with said memory, said control circuit being arranged to produce said control signal, said control circuit including:

first means for determining the rate at which the load on the engine is changing; and second means for modifying said control signal in the event that said first means indicates that the the load on the engine is reducing at a rate which is greater than a predetermined value.

7. A method of controlling the level of line pressure in an automatic transmission, the steps comprising:

determining the load on engine operatively connected with said said transmission;

controlling the level of line pressure in accordance with the load on the engine;

detecting the rate at which the load on the engine is reducing being above a predetermined level; and delaying the reduction in the line pressure in the event that the load on the engine reduces at a rate above said predetermined one.

8. A method as claimed in claim 7 wherein said line pressure reduction delaying comprises reducing the line pressure by predetermined increments from the time the rate at which the torque is detected reducing at a rate above said predetermined one.

9. A method as claimed in claim 7 further comprising the steps of:

monitoring the rotational speed of the engine;

using the sensed rotational speed to determine the timing with which said line pressure reduction delay should be terminated.

10. A method as claimed in claim 7 further comprising the steps of:

sensing the rotational speed of the engine;

maintaining the level of line pressure at a predetermined level until the rotational speed of the engine has reduced below a predetermined rotational speed.

11. A method as claimed in claim 7 further comprising the steps of:

sensing the rotational speed of the engine;

decrementing the level of line pressure by increments which vary with the rotational speed of the engine until the rotational speed of the engine has reduced below a predetermined rotational speed.

* * * * *